UNITED STATES PATENT OFFICE.

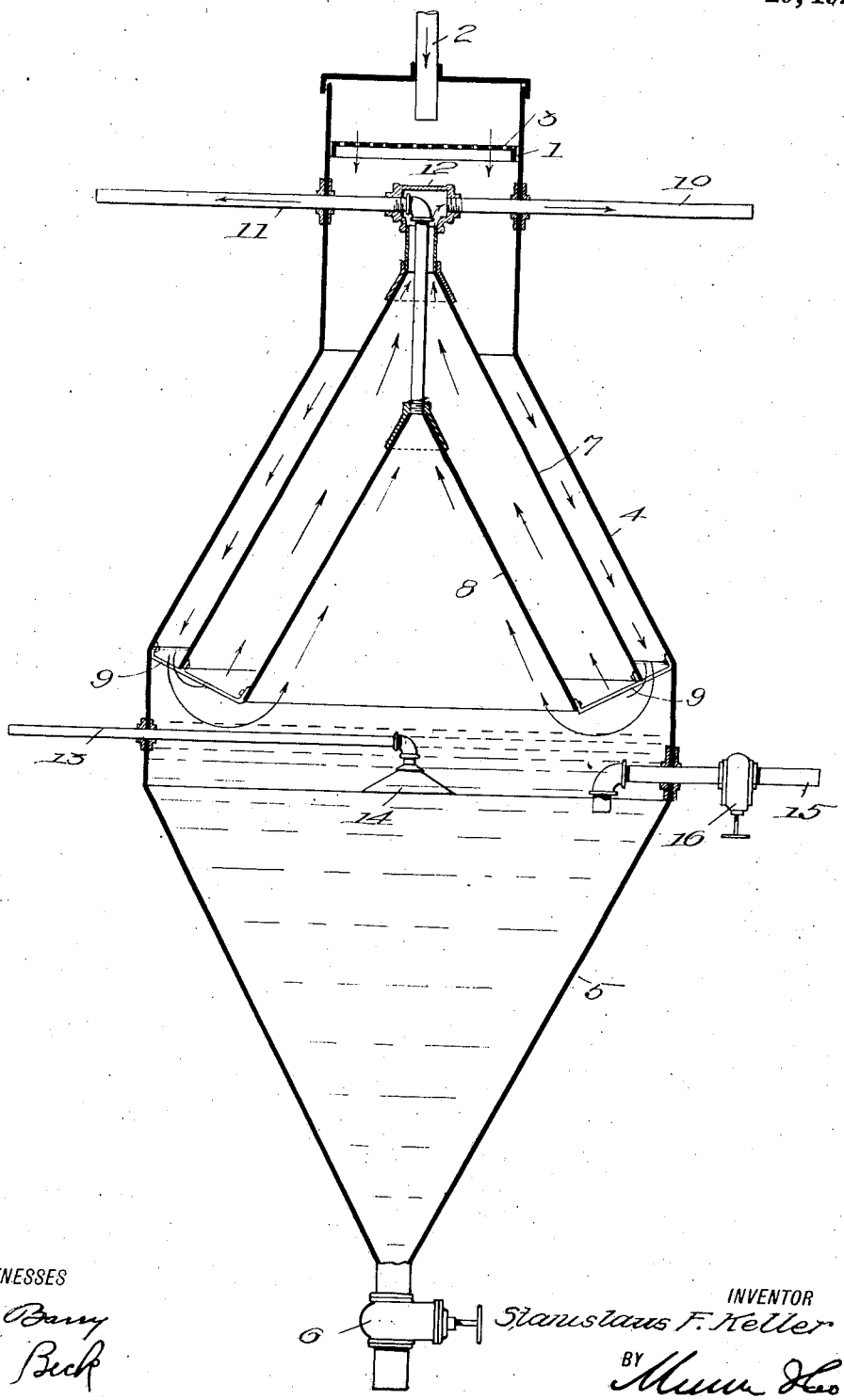

STANISLAUS FREDRICK KELLER, OF FRANKLIN, LOUISIANA.

SETTLING-TANK.

1,345,090.  Specification of Letters Patent.  Patented June 29, 1920.

Application filed March 7, 1917. Serial No. 152,968.

*To all whom it may concern:*

Be it known that I, STANISLAUS F. KELLER, a citizen of the United States, and a resident of Franklin, in the parish of Saint Mary and State of Louisiana, have invented certain new and useful Improvements in Settling-Tanks, of which the following is a specification.

My invention is an improvement in settling tanks, and has for its object to provide a tank of the continuous operating type for the clarification or separation of sugar cane juice or the like, after said juice has been treated with sulfur dioxid and neutralized with calcium hydrate, wherein the juice follows the natural trend of liquid that has been heated.

In the drawings is shown a sectional view of the improved settling tank.

In the present embodiment of the invention, a cylindrical tank 1 is provided for receiving the juice, the said tank having an inlet 2, and a strainer in the form of a perforate plate 3 is arranged transversely of the tank just below the inlet. Below the tank 1, and forming a continuation thereof is a tank consisting of portions 4 and 5 which are approximately conical having their large ends continuous.

The small end of the portion 4 is continuous with the lower end of the section 1, and the small end of the portion 5 is provided with a drain valve 6, for permitting the sediment to be withdrawn. Within the portions 1 and 4 of the tank is arranged two concentric cones 7 and 8 respectively, the lower ends of the cones being connected by suitable brackets 9 to each other and to the wall of the portion 4 of the tank. These brackets hold the cones in proper spaced relation, and outlet pipes 10 and 11 are connected with the upper ends of the cones. The pipe 11 extends upwardly through the cone 7 to a T at the upper end thereof, from whence the said pipe extends laterally from the T through the wall of the portion 1 of the tank. The pipe 10 is connected with the other end of the T and likewise extends outwardly through the wall of the portion 1 of the tank, but in the opposite direction to the pipe 11.

A test pipe 13 is provided, the said pipe being arranged at the junction of the portions 4 and 5 of the tank, and leading out laterally through the tank wall, and this pipe extends to the center of the tank where it is provided with an inverted funnel shaped entrance 14. A pipe 15 is connected with the tank at about the same level as the pipe 13, the said pipe 15 being intended for use when the tank is out of use for cleaning or otherwise, in drawing off the contents of the tank. This pipe has a valve 16 and the pipe may be connected with a suction tank or the like to charge the tank of the evaporator.

In operation, the juice flows into the tank through the pipe 2 and is strained by the strainer 3. Here the juice passes down between the cone 7 and the portion 4 of the tank to the bottom of the tank. Here the juice changes the direction of flow, part going up between the cones 7 and 8 and part within the cone 8, through the pipes 10 and 11 respectively. The scum, mud and the like that settles to the bottom may be drawn off at the valve 6, either continuously or intermittently, as may be desired. It will be understood that the drawing off at this point, is to be controlled by the condition of the juice, as ascertained by the test pipe 13. The warm juice flowing down between the cones 4 and 7, tends to cool more rapidly than that at the interior of the tank, and the natural tendency of the cooling juice is to flow downward. The juice at the center however, is hotter and tends to flow upward, thus providing for a rapid settling and a good separation of the solids from the juice.

I claim:

In combination a settling tank having an inlet at its top and an outlet at the bottom, and a plurality of conical deflecting settling members at the upper end of the tank upon the outermost of which the juice is fed, said members being arranged in spaced relation and one within the other and having their lower edges at practically the same level, the members discharging at their upper ends.

STANISLAUS FREDRICK KELLER.

Witnesses:
LAVINIA BOURGERIS,
LORA KIHNEL.